United States Patent
Gagne et al.

(10) Patent No.: US 6,542,974 B2
(45) Date of Patent: *Apr. 1, 2003

(54) METHOD AND APPARATUS FOR INDEPENDENT AND SIMULTANEOUS ACCESS TO A COMMON DATA SET

(75) Inventors: Mathieu Gagne, Boston, MA (US); Haim Kopylovitz, Brookline, MA (US); Yuval Ofek, Framingham, MA (US); Natan Vishlitzky, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/118,518

(22) Filed: Apr. 8, 2002

(65) Prior Publication Data

US 2002/0112133 A1 Aug. 15, 2002

Related U.S. Application Data

(63) Continuation of application No. 09/303,242, filed on Apr. 30, 1999, now Pat. No. 6,370,626.

(51) Int. Cl.[7] .............................................. G06F 12/00
(52) U.S. Cl. ....................................................... 711/154
(58) Field of Search ......................... 711/117–118, 154, 711/162, 168; 710/39, 52; 714/6

(56) References Cited

U.S. PATENT DOCUMENTS

| | | | |
|---|---|---|---|
| 5,574,950 A | 11/1996 | Hathorn et al. | 395/861 |
| 5,680,640 A | 10/1997 | Ofek et al. | 395/839 |
| 5,742,792 A | 4/1998 | Yanai et al. | 395/489 |
| 5,835,954 A | 11/1998 | Duyanovich et al. | 711/162 |

Primary Examiner—Do Hyun Yoo
Assistant Examiner—Mehdi Namazi
(74) Attorney, Agent, or Firm—George A. Herbster

(57) ABSTRACT

A method and apparatus for enabling a common data set to be utilized by multiple data processes. During a first operating mode, first and second data stores in a data storage facility with a common buffer attach to a first data process and act as mirrors. Data to be written transfers to the common buffer and then to the data stores. A second command produces a split whereby the first data store remains attached to the first data process and the second data store is available to the second data process. After the second command is executed, any data in the common buffer is transferred to the corresponding data stores in parallel with and transparently to the actions between the first and second data processes and the first and second data stores, respectively.

7 Claims, 13 Drawing Sheets

METHOD AND APPARATUS FOR INDEPENDENT AND SIMULTANEOUS ACCESS TO A COMMON DATA SET

CROSS-REFERENCE TO RELATED APPLICATION

This application is a continuation of U.S. patent application Ser. No. 09/303,242 filed Apr. 30, 1999, now U.S. Pat. No. 6,370,626 issued Apr. 9, 2002, entitled Method and Apparatus for Independent Simultaneous Access to A Common Data Set.

U.S. Letters patent application Ser. No. 08/842,953 filed Apr. 25, 1997, now U.S. Pat. No. 6,101,497 issued Aug. 8, 2000, by Yuval Ofek for a Method and Application for Independent and Simultaneous Access to a Common Data Set and assigned to the same assignee as this invention that is incorporated herein by reference.

BACKGROUND OF THE INVENTION

1. Field of the Invention

This invention generally relates to data storage facilities for data processing systems and more particularly to a data storage facility that enables the manipulation of common data by first and second data processes.

2. Description of Related Art

The above-cited reference discloses a concept whereby a first physical disk drive, as a first or, standard, mirror stores data and a second physical disk drive, as a BCV mirror in one of two operating modes, stores a mirror copy of the data. That mirror, called a BCV volume in the above-identified reference, can then be split and attached to another application or process that operates on the data independently of operations by another data process on the data in the standard mirror. A controller associated with the data storage facility maintains a list of all changes to the standard mirror in response to a first process and to the second, or BCV, mirror volume while it is attached to the second data process. When it is desired to reestablish synchronization between the mirrors, all data that needs to be altered in the BCV mirror is identified to enable resynchronization.

In such a data storage facility, a write request from the first data process during the first operating, or mirroring mode, transfers to a cache slot in a cache or buffer memory common to the standard BCV mirrors. An acknowledgement is returned to the requesting data process when the write transfer request is stored in the buffer. Thereafter, and in response to an asynchronous process, the write request in the buffer is destaged whereby the associated data transfers from the cache slot to each mirror in separate destaging operations. During the interval between the receipt of a write request in the cache slot and the destaging operation, write requests located in the buffer memory are pending write operations and are designated as "write pendings". At any particular time the buffer may contain up to hundreds or even thousands of write pendings.

As described in the above-identified reference, upon receipt of a split command the BCV mirror stops acting as a mirror for the standard mirror and attaches to the second data process that may be operating in the same host or another host device. However, all devices with which the BCV mirror operates are locked during this shift or transition. While the mirrors are locked, the status of all write pendings and previous write requests are managed as described in the above reference. No further write requests from either data process will be accepted while the lock is in place.

Specifically, after the lock is achieved, a program module performs a number of functions on a track-by-track basis. If a write pending is associated with a track, the module immediately performs the necessary steps for processing that write pending operation. If a previous write operation has occurred and been destaged, the module also performs any updates to track invalid bits. The lock is not released until this process has been completed for all tracks in the logical volume. Consequently, this process can be very time consuming, particularly if there are a large number of write pendings at the time the split occurs. In fact it is possible that the lock may be in place for seconds or even minutes. Such delays are not acceptable in many applications. What is needed is a system that can provide a basic BCV-type function and allow a transfer of a BCV mirror from operation with a first data process to independent operation with a second data process without introducing any significant time delays into the operation of the data process.

SUMMARY

Therefore it is an object of this invention to provide a method and apparatus characterized by allowing a storage device to switch between operating modes with minimal interruption to operating data processes.

Another object of this invention is to provide a data storage facility that in a first operating mode provides redundant data storage and in a second operating mode enables one copy of a data set to be accessed by another data process wherein the switch between the first and second operating modes occurs with minimal interruption of either the first or second data processes.

In accordance with one aspect of this invention, a data storage facility enables the manipulation of common data by first and second data processes. The data storage facility includes first and second data stores and a buffer whereby a write request is processed by transferring the write request to the buffer and thereafter transferring data to a data store. A control for the data storage facility includes first and second control modules. The first control module transfers the operation of the storage facility from a first operating mode to a second operating mode. During the first operating mode, the second data store acts as mirror for data in the first data store and is available to the first data process. During the second operating mode the second data store becomes available to the second data process. The second control module responds to the transfer effected by the first control module by thereafter performing any processing required by write requests processed during the first operating mode including write requests in the buffer at the time of the shift to the second operating mode. This processing occurs in parallel with and transparently to any interaction with the first and second data stores and the first and second data processes, respectively.

In accordance with another aspect of this invention, data transfers in a data processing system can occur between first and second data processes and a data storage facility with first and second data stores and a buffer. The data storage facility responds to a predetermined transfer request by transferring data to a write pending location in the buffer and thereafter transferring the corresponding data to the data stores. During a first operating mode the first and second data stores act as mirror memories, and the system maintains an identification of all write operations that occur including write pending operations. When a predetermined command is received, the system connects the second data store for operation with the second data process in parallel with continued operations between the first data store and the first data process. Data transfer requests for data in a write pending data location in the list in either of the first and second data stores effects a transfer of the data to the second data store.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
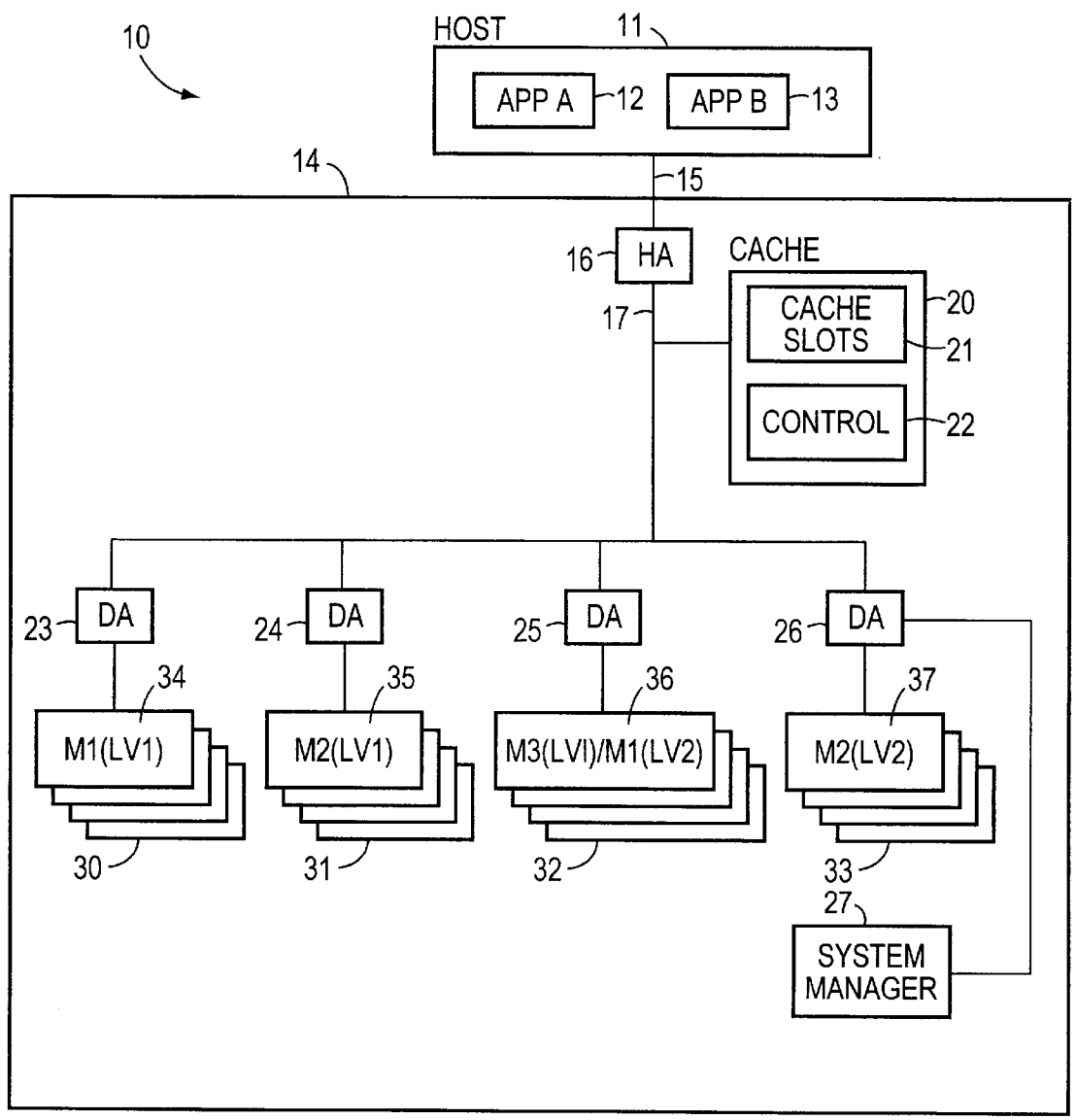
FIGS. 1 and 2 are block diagrams of two data processing facilities that are adapted for incorporating this invention.

FIG. 1 depicts one configuration of a data processing system 10 with a host 11 that may comprise one or more central processors operating under a conventional operating system. As depicted the host 11 includes two applications: an APP A application 12 and an APP B application 13. These two applications constitute two data processes. Although these applications are shown as residing in the host 11, it will be apparent that a number of hosts can operate in parallel with a single data storage facility 14 and that the two applications 12 and 13 can be in the same or different hosts. Each of the applications 12 and 13 will have the capacity of issuing data transfer requests in the form of read and write requests, among others, for transferring data from and to the data storage facility 14 over a bus 15.

The data storage facility 14 includes a host adapter 16 that connects to the bus 15 and receives the data transfer requests. It is a programmable device that can initially process these requests to determine a number of characteristics and perform initial context and syntax error checking. The host adapter 16 communicates with the remainder of the elements of the data storage facility over a bus 17 that attaches to a cache 20. The cache 20 acts as a buffer and stores data in accordance with a number of functions. Two particularly important functions are disclosed as comprising an area devoted to cache slots 21 and another area 22 devoted to control.

The main storage elements in the data storage facility are accessed through disk adapters (DA) 23 through 26 that connect in parallel to the bus 17. Like the host adapters, each disk adapter is a programmable device that responds to commands from a host adapter or a system manager. The system manager 27 connects to one of the disk adapters, such as the disk adapter 26 to allow configuration changes and other functions to be performed throughout the data storage facility 14. Specifically the system manager 27 enables a system operator to configure the mirroring configuration, to configure a logical volume and to establish parameters by which the host adapter 16 "knows" that specific write requests are directed to mirrored logical volumes. Each of the disk adapters connects to a corresponding physical disk drives. For purposes of explanation, FIG. 1 depicts disk adapters 23 through 26 connected to sets of physical disk drives 30 through 33.

As known, each of the APP A and APP B applications 12 and 13 address "logical volumes". In a mirrored configuration, a logical volume will include multiple, or mirror, copies of data distributed over multiple physical disk drives. Within each physical drive a mirror copy will be stored in cylinders, each of which will include multiple tracks of the physical disk drive. The data storage facility 14 then converts read and write requests addressing a logical volume into an identification of a specific track or tracks from which or to which the data is read or written. Granularity decreases from logical volumes to physical disk drive cylinders and to physical disk drive tracks. A single physical disk drive may contain a part of a mirror copy of the data in a portion or all of a single logical volume or even multiple logical volumes.

For purposes of explanation it is assumed that the physical disk drives 30 through 33 have been configured to store data in at least two logical volumes LV1 and LV2, each in a mirrored configuration. The physical disks 30 and 31 are configured to store M1(LV1) and M2(LV1) copies 34 and 35 of the data in the LV1 logical volume. It is also assumed that the system manager 27 has configured the physical disk drive 32 as a BCV device 36 to act as an M3(LV1) mirror for the LV1 logical volume in a first operating mode and as an M1(LV2) mirror in a second operating mode, as described in the above-identified reference. In this example, the physical disk drive 33 stores an M2(LV2) mirror copy of the LV2 logical volume.

In the above-identified reference, an ESTABLISH command initiates the first operating mode whereby the M3(LV1)/M1(LV2) device 36 is brought into synchronism with the M1(LV1) and M2(LV1) devices 34 and 35. A SPLIT command causes the M3(LV1)/M1(LV2) device 36 to be isolated from the M1(LV1) and M2(LV1) devices 34 and 35 and to operate in conjunction with the M2(LV2) device 37 and respond to a second data process, such as the APP B application 13, after the M2(LV2) device 37 comes into synchronism with the M3(LV1)/M1(LV2) device 36.

Figure 2:
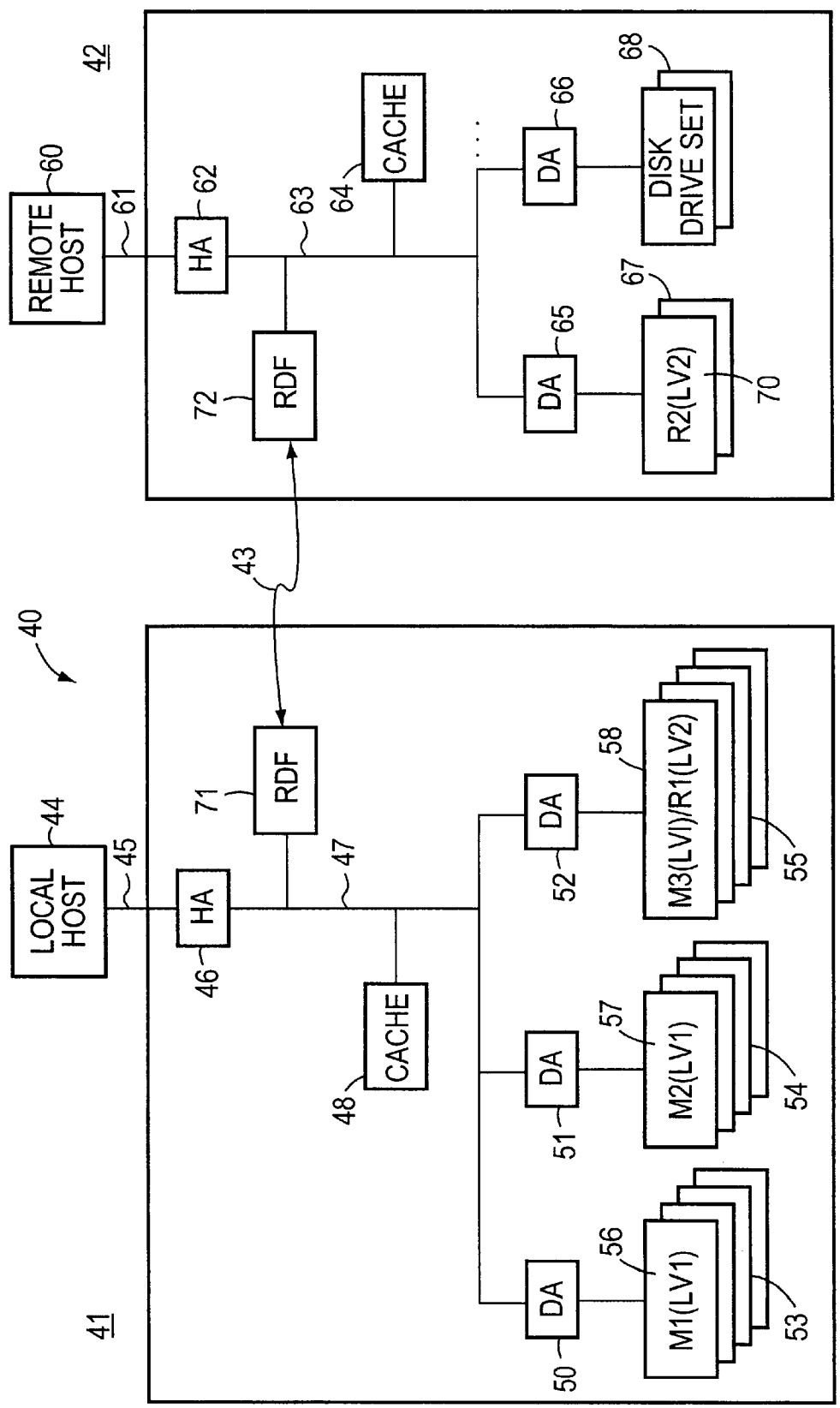

FIG. 2 depicts another embodiment of a data processing system 40 that includes a local site 41 and a remote site 42 interconnected by a communications link 43. The local site 41 includes a local host 44 that communicates over a bus 45 with a data storage facility including a host adapter 46, an interconnecting bus 47 and a cache 48. The bus 47 connects to disk adapters 50 through 52 that, in turn, connect to physical disk drive sets 53 through 55. In this particular embodiment and for purposes of explanation, the physical disks define an M1(LV1) device 56, an M2(LV2) device 57 and an M3(LV1)/R1(LV2) logical device 58.

The remote site 42 includes a remote host 60 and a similar data storage facility that receives data transfer requests over a bus 61. A host adapter 62 connects between the bus 61 and an internal bus 63 connected to a cache 64 and to disk adapters 65 and 66. The disk adapters 65 and 66 connect to sets of physical disk drives 67 and 68 respectively. For purposes of this discussion, assume that the physical disk drive set 67 contains an R2(LV2) device 70 for an LV2 logical volume. Communications between the two devices is obtained by including a remote data facility (RDF) 71 and an RDF 72 that form a path between the buses 47 and 63 at the local and remote sites 41 and 42 respectively. In many operations the system shown in FIG. 2 provides a remote redundant system that operates in synchronism or near synchronism with the local system 41.

For purposes of further explaining this invention, it is assumed that the M3(LV1)/R1(LV2) device 58 responds to an ESTABLISH command by acting as an M3 mirror for the logical volume LV1 mirrored on the M1(LV1) and M2(LV1) devices 56 and 57. In a second operating mode the M3(LV1)/R1(LV2) device 58 is isolated from the M1(LV1) and M2(LV1) devices 56 and 57 to be attached through the RDF 71 and RDF 72 to an R2(LV2) device 70 at the remote site 42. In this particular embodiment the local host 44 could contain one application and the remote host 60 another application. In the SPLIT condition, the M3(LV1)/R2(LV2) device 58 then is available to the application program in the remote host.

Figure 3:
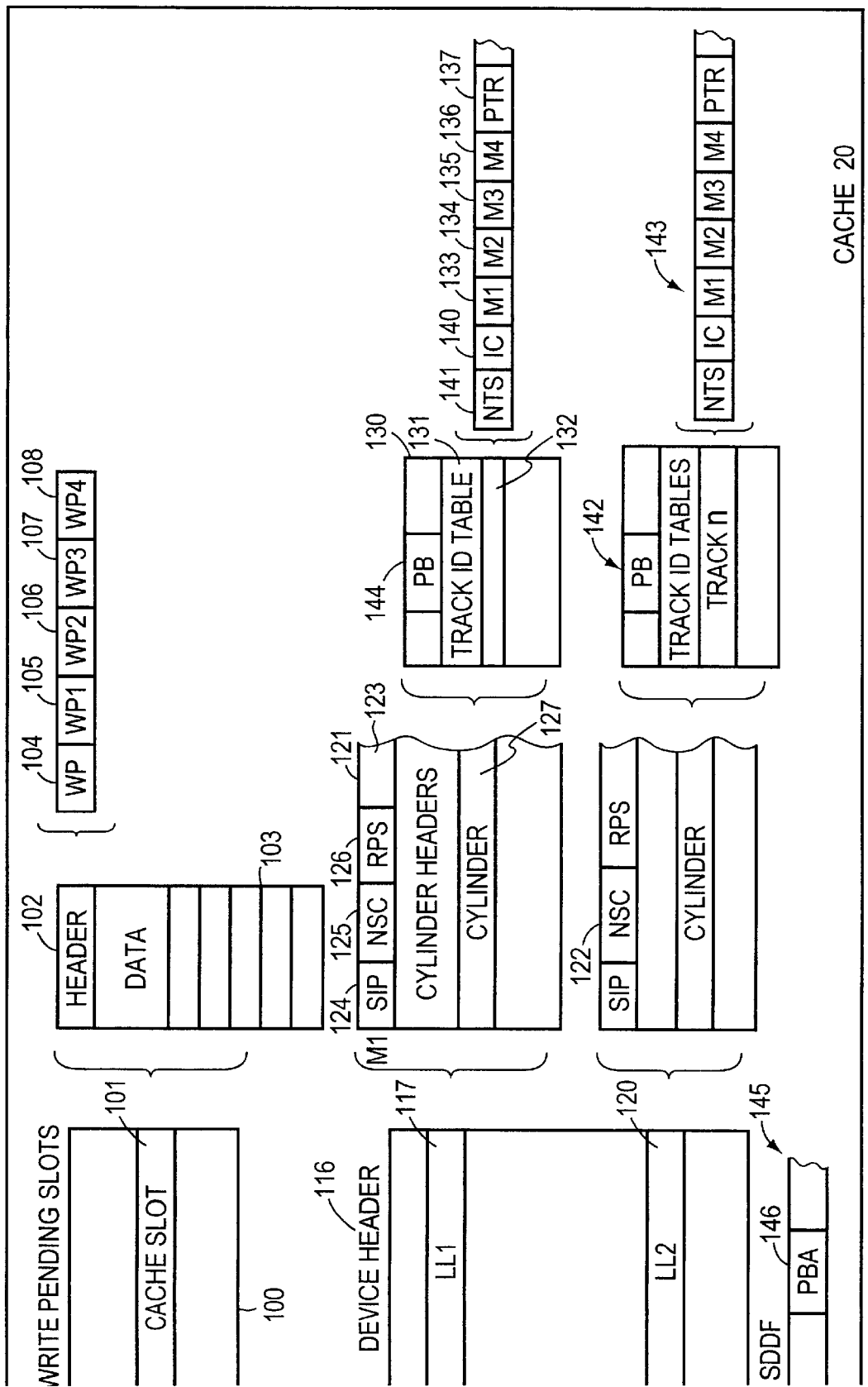
FIG. 3 depicts a specific embodiment of a buffer memory used in the systems of FIGS. 1 and 2 in accordance with this invention.

FIG. 3 depicts the organization of a cache, such as the cache 20 in FIG. 1. As will become apparent such a cache organization would also be included in the cache 48 and cache 64 in FIG. 2. The cache 20 includes write pending slots 100 with a particular cache slot 101 being shown in detail. Each cache slot includes a header 102 and data 103 to be written. The header 102 includes a WP flag 104 that is set when any of its WP1 through WP4 flags 105 through 108 is set. As known, the WP1 through WP4 flags in the header denote each mirror for the logical volume and indicate whether a write pending is associated with M1 through M4 mirrors, respectively. As described in the above-identified reference, the BCV feature requires that flags associated with the fourth mirror, M4, be available for operations, so only three actual mirrors can be attached to a host. In the embodiment shown in FIG. 1, the host adapter 16 would set the WP1 through WP3 flags 104 through 106 to indicate the existence of a write request to the LV1 logical volume.

As an asynchronously operating destaging process operates, it will identify a write pending cache slot and a WP flag, such as the WP1 flag 105, and transfer the data from the data buffer 103 to a corresponding mirror, such as the M1(LV1) mirror 34 and then clear the WP1 flag 105. When a subsequent destaging process clears any of WP flags 105 through 108 and all these flags are cleared, the destaging process will then clear the WP flag 104. When this occurs, it is possible to release the cache slot, such as the cache slot 101.

A device header section 116 includes a device header for each logical volume or device. In the context of the system shown in FIG. 1, an L1 header 117 is associated with the LV1 logical volumes; and L2 header 120 with the LV2 logical volume. Each of these headers identifies the cylinders associated with the logical volume. Each cylinder block, such as a cylinder block 121 for the LV1 logical volume and a cylinder block 122 associated with the LV2 logical volume, have similar structures. Looking at the cylinder block 121, a header 123 includes a split in progress (SIP) bit 124, a next split cylinder (NSC) field 125 and a reset pending split (RPS) flag 126. The cylinder block then contains a list of all the cylinders associated with the LV1 logical volume, with a cylinder entry, such as a cylinder 127. Each cylinder entry has the same format; the cylinder entry 127 is specifically shown and comprises a header 130 and a Track ID Table 131 for each track in the cylinder. Each track entry, such as a track entry 132, includes information, such as M1 through M4 invalid bits 133 through 136 and a pointer (PTR) 137 to a cache slot. An In-Cache (IC) flag 140 indicates whether the data for that track is in the cache slot 21. To implement this specific embodiment, each track entry additionally includes a Need-To-Split Me (NTS) flag 141 as described later. Like the device header 117 for the LV1 logical volume, the device header 120 for the LV2 logical volume includes the cylinder block 122 with cylinder entries 142 and track entries 143.

Each header in a cylinder entry, such as header 130 includes a PB field 144 with a bit assigned to each track in a particular cylinder. As specifically implemented, the PB field 144 is one of several like sections that can be assigned to specific functions. Each PB bit is set whenever a change is made to a track in the logical volume. In an actual system there are multiple and assignable protection bit fields. An SDDF or similar register 145 includes a PBA field 146 that identifies which PB field is associated with the ESTABLISH and SPLIT operations.

In accordance with the underlying principle of this invention, the connection of the M3(LV1)/M1(LV2) device 36 in FIG. 1 as a mirror for the logical volume LV1 is accomplished when a host, such as the host 11, generates the ESTABLISH command. As described in the above-identified reference, the information in the various M3 flags, such as the M3 flag 135, in each track entry for the LV1 logical volume is set to an invalid state. Consequently all the data from the M1(LV1) device 34 is copied to the M3(LV1)/M1(LV2) device 36 to bring the device 36 into synchronism with the M1(LV1) device 34. In the above-identified reference, the M3(LV1)/M1(LV2) device 36 can be then detached from the M1(LV1) device 34 and made available to another application such as the APP B application 13 through the SPLIT command.

In accordance with this invention, the generated command is an INSTANT SPLIT command. The prior SPLIT command required that all write pendings in the cache slots 100 associated with the M1(LV1) logical volume and other matters be managed before the M3(LV1)/M1(LV2) device was made available to the APP B application 13. The INSTANT SPLIT command attaches the M3(LV1)/M1(LV2) device 36 to the APP B application 13 and makes the M1(LV1) device 34 available to the APP A application 12 before any write pendings or any other matters associated with track changes are processed.

After this initial split has occurred, one of two modules handles any prior changes. A first module performs a background process that methodically identifies and processes each change including each write pending operation. The second process is an "on demand" process that responds to predetermined data transfer requests to either the LV1 or LV2 logical volumes. These processes, individually and collectively, eliminate the long delays inherent with the prior SPLIT command.

This invention could be implemented in any number of specific ways. FIGS. 4 through 11 depict one approach that divides the total operation in response to an INSTANT SPLIT command, or other like-named command, into three phases. The first phase involves the immediate response to the command by which the M3(LV1)/M1(LV2) device 36 or like device during which it detaches from the M1(LV1) device 34 and attaches to the APP B application 13 as a second data process. A second, or priority management, phase addresses any data transfer request generated by the APP A application 12 or APP B application 13 during an interval while write pendings that were produced prior to the split still exist. The third, or background, management phase relates to the background process that undertakes the management of various issues, including write pendings in an ordered fashion. Both the second and third phases can occur concurrently with and in parallel with other operations. As a result the disconnect of the M3(LV1)/M1(LV2) device 36 from the M1(LV1) device 34 produces a minimal interruption of the interaction between the APP A application 12 and the M1(LV1) device 34. Likewise there is a minimal delay between the split operation and the attachment of the M3(LV1)/M1(LV2) device 36 to an application or data process such as the APP B application 13.

Response to "INSTANT SPLIT" Command

Figure 4:
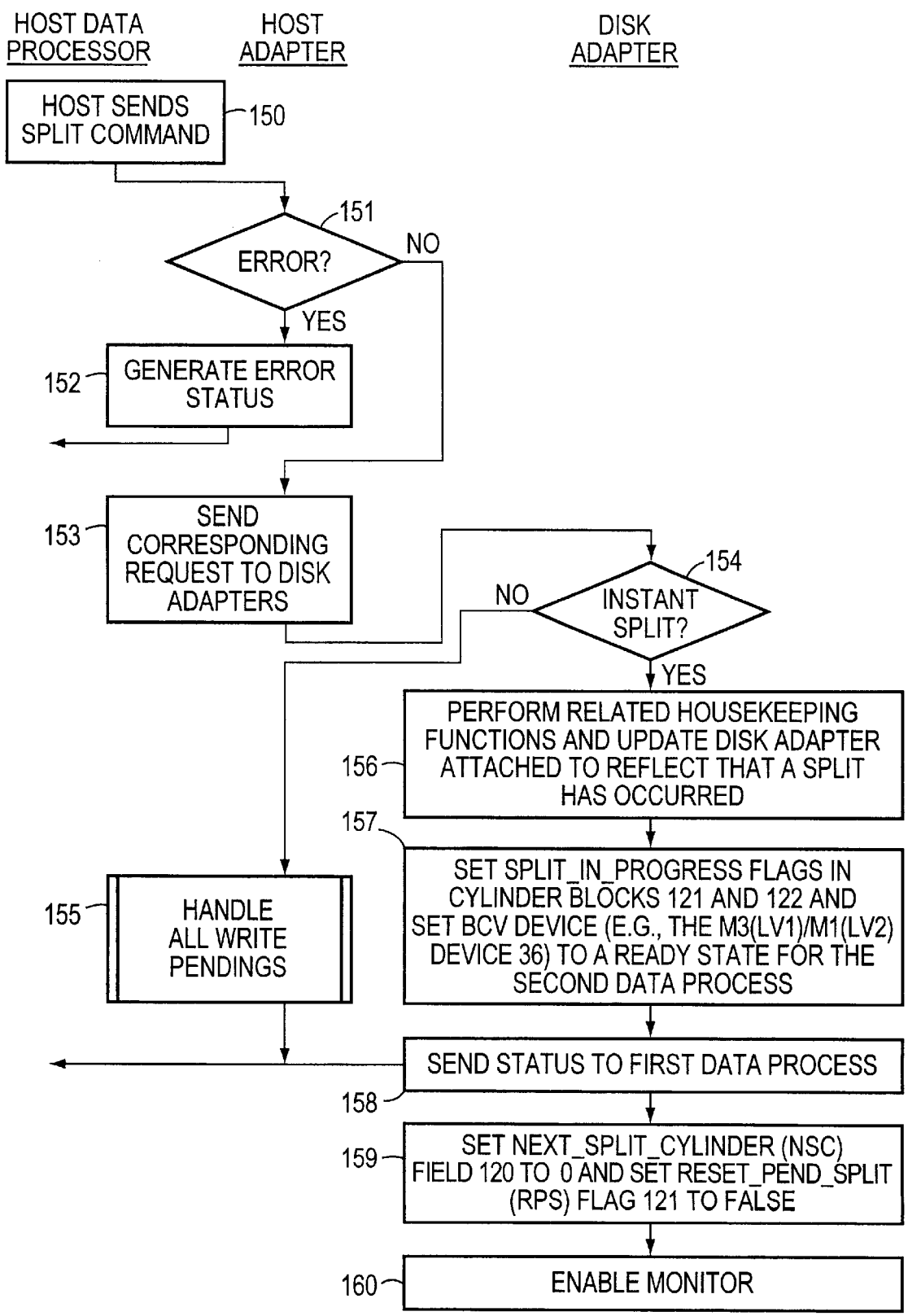
FIG. 4 depicts the operation of various components in FIGS. 1 and 2 in response to predetermined command from a first data process.

FIG. 4 depicts the immediate response to the issue of a generalized "split" command in step 150 that is, either the prior "SPLIT" COMMAND or the "INSTANT SPLIT" command of this invention. As known in the art a host adapter, such as the host adapter 16, receives this command and tests it for any error in step 151, generating an error status in step 152 if appropriate. Normally control transfers from step 151 to step 153 that sends the corresponding request to the disk adapters.

The disk adapter associated with the mirror being split, such as the disk adapter 25 associated with the M3(LV1)/M1(LV2) device 36, then uses step 154 to determine whether the split command is an INSTANT SPLIT command or the SPLIT command. If a SPLIT command, control transfers to a procedure 155 that represents the prior art handling of all operations required to make the split, including the processing of all pending write operations and the updating of appropriate invalid bits, such as any of the M1 through M4 bits in various Track ID Tables. During this prior art procedure all the devices associated with this SPLIT command were locked for the duration of the procedure 155, some times introducing unacceptable delays in the transfer of operations in response to the SPLIT command. After procedure 155 completed, an acknowledgement was sent to the host to indicate operations could proceed, and the M3(LV1)/M1(LV2) device 36 in FIG. 1 or like device was then made available to a second data process such as the APP B application 13.

In response to the INSTANT SPLIT command provided by this invention control passes from step 15 to step 156 during which the disk adapter 26 performs various housekeeping functions that are similar to many of those performed by procedure 155 including the assignment of one set of PB bits. The selection being recorded in the PBA field 146 of the SDDF session register 145. In addition the disk adapters connected to related devices, particularly the disk adapter attached to a standard device such as the device M1(LV1) device 34 is updated to reflect that a split has occurred. In step 157 the split-in-progress (SIP) flags associated with both logical volumes involved with the split are set, such as the SIP flag 124 for the LV1 logical volume and the corresponding SIP flag in the cylinder block 122 for the LV2 logical volume. The M3(LV1)/M1(LV2) device 36 immediately becomes available to a second data process, such as the APP B application 13 and the data becomes the data in the LV2 logical volume. Step 158 then sends the status to the first data process so that the APP A application 12 can continue.

Whereas procedure 155 includes managing all operations including write pendings, steps 156 and 157 do not incorporate any such operations. Thus the operations of these steps occur in the microsecond time domain. Accordingly the interruption is relatively transparent to and does not adversely impact the operation of the APP A application 12 or the start of the APP B application 13.

After the status is sent to the first data process in step 158, step 159 sets the next split cylinder (NSC) field 125 to 0 and sets the reset pending split (RPS) flag 126 to a false condition. These steps then produce initial operating conditions for a monitor that is enabled in step 160 and that is described with respect to FIGS. 7 through 9. When the operation in FIG. 4 completes, the first data process represented by the APP A application 12 is able to generate data transfer requests for the LV1 logical volume stored in the M1(LV1) and M2(LV1) devices 34 and 35 while the APP B application is able to generate data transfer requests with the M3(LV1)/M1(LV2) and M2(LV2) devices 36 and 37. Moreover, the cache 20 contains information in the cache slots 101 and the device headers 116 that act as lists of tracks in the data stores for which write data transfers were pending at the time of the transfer to the second operating mode.

Response to Host Generated Read and Write Requests

Figure 5:
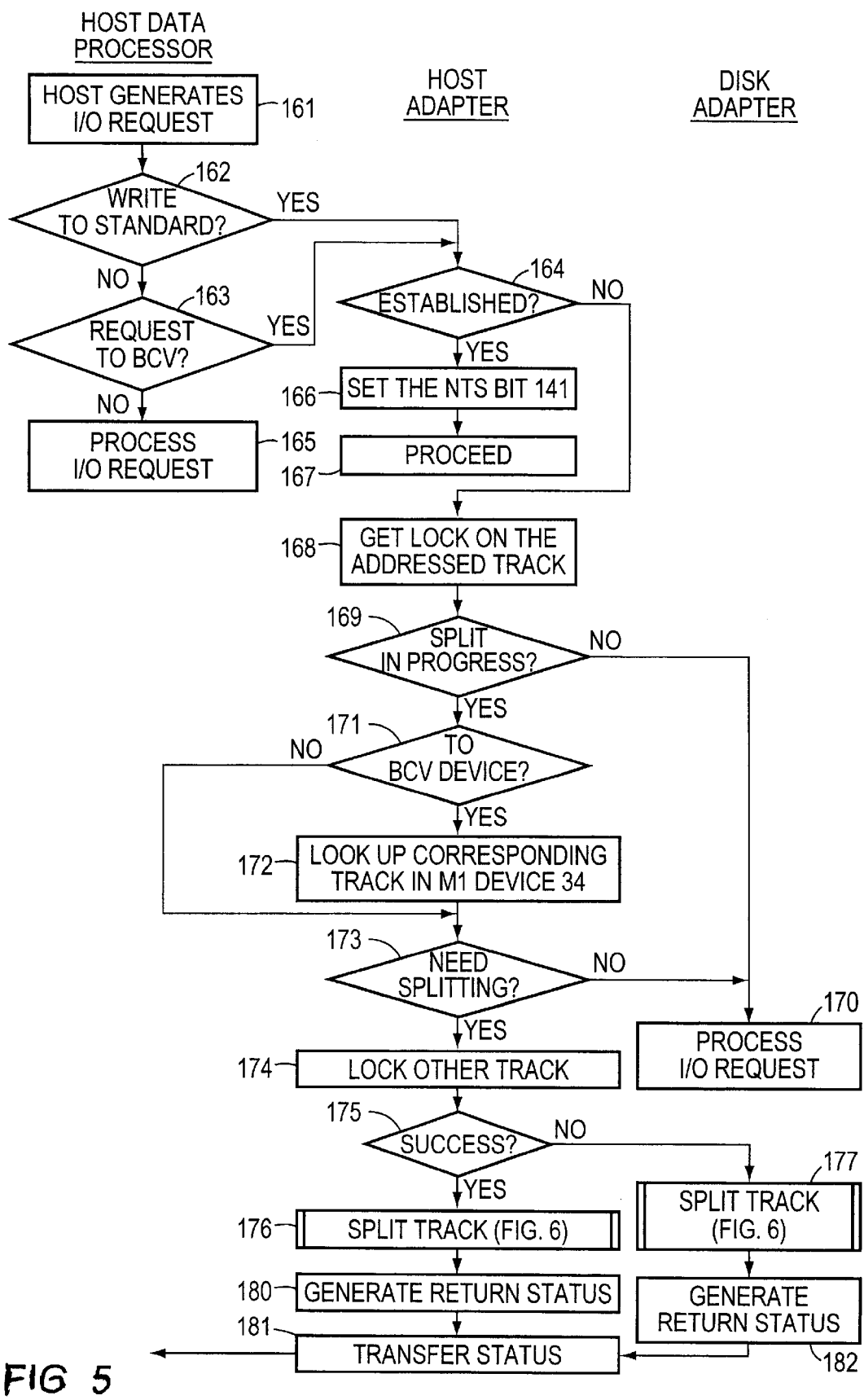
FIGS. 5 and 6 depict the operation of various components in FIGS. 1 and 2 in response to data transfer requests issued after the operations of FIG. 4 are complete.

FIG. 5 demonstrates the response of the system when either the APP A application 12 or the APP B application 13 generates a data transfer request in the second operating mode. Step 161 is representative of the receipt of such a data transfer request. Steps 162 and 163 analyze the request. If the request is a write request from the APP A application 12 or either a read or write request from the APP B application 13, control passes to step 164 in the corresponding host adapter, such as the host adapter 16. For other types of operations, such as a read transfer request generated by the APP A application 12 for the M1(LV1) device 34, control passes from 163 to step 165 for normal processing.

Step 164 determines whether the logical volume is operating in the first, or ESTABLISHED operating mode or in the second, or SPLIT, operating mode. If a write request occurs during the first operating mode, control passes to step 166 to set the NTS bit in the Track ID Table 132 for the LV1 logical volume. Then control transfers to step 167 and normal operations proceed. Thus, when the INSTANT SPLIT command is executed, the NTS bits indicate all the changes that occurred to the LV1 logical volume during the ESTABLISHED operating mode. Otherwise control passes to step 168 to get a lock on the addressed track and then process any write pendings for that track before processing the data transfer request.

The reasoning for handling such pending write requests can be best understood by considering some examples. As a first example, assume the APP A generates, as a new request a write request that effects a track for which an old request issued prior to the split is still pending. Without this invention, the new request would overwrite the old request before the data associated with the old request was transferred to the M3(LV1)/M1(LV2) device 36. As a result, data associated with the new request would overwrite the data in the M3(LV1)/M1(LV2) device 36 and would corrupt the data in the LV2 logical volume.

As a second example, assume that after a split APP B application 13 generates a read request for data in the M3(LV1)/M1(LV2) device 36 while there is a pending write request in the cache 20 from prior to the split. The data being read from the M3(LV1)/M1(LV2) device 36 would not be current, so the data in the LV2 logical volume again would be corrupt.

There are other examples of operating sequences that could corrupt data. The balance of the steps in FIG. 5 provide the necessary controls to avoid any such data corruption in response to a data request. First, the data request uses step 169 to look at its respective SIP flag. If the request is from the APP A application 12, step 169 tests the SIP flag 124; if from the APP B application, the SIP flag in the cylinder block 122. If the corresponding SIP flag is cleared, control passes to step 170 to process the request normally.

If the request is directed to the M3(LV1)/M1(LV2) device 36 from the APP B application 13, step 171 transfers control to step 173 to determine whether the corresponding track in the standard, or M1(LV1), device 34 needs to be split by testing the NTS flag 141 in the Track ID Table 132. This same test is performed if APP A application issues a write request. If the NTS flag 141 is cleared, control transfers to step 170, again with no significant increase in overhead. As will be apparent, the steps through step 173 impose essentially no overhead on the normal processing of a data request. Consequently, these prior tests do not impact normal operations to any measurable extent.

If the NTS flag 141 is set, step 173 transfers control to step 174 to lock the "other" track. If the APP A application 12 issues the write request, the "other" track is in the M3(LV1)/M1(LV2) device 36; if the APP B application 13, the "other" track is in the M1(LV1) device 34.

Step 175 determines whether the lock was immediately successful. If it is, control transfers to procedure call 176 for a SPLIT TRACK procedure of FIG. 6 because this is the most efficient procedure. If the lock is not immediately available, control transfers to a corresponding call 177 in the disk adapter 25. The test that step 175 performs is optional and may be omitted if an election made as to whether a host adapter or disk adapter will always perform the function of FIG. 6. When the test of step 175 is used, the host adapter will generate a return status in step 180 and use step 181 to transfer that status to the host. If the disk adapter performs the operation, in response to the call 177, step 182 will generate the status for transfer through the host adapter using the facilities of step 181.

Figure 6:
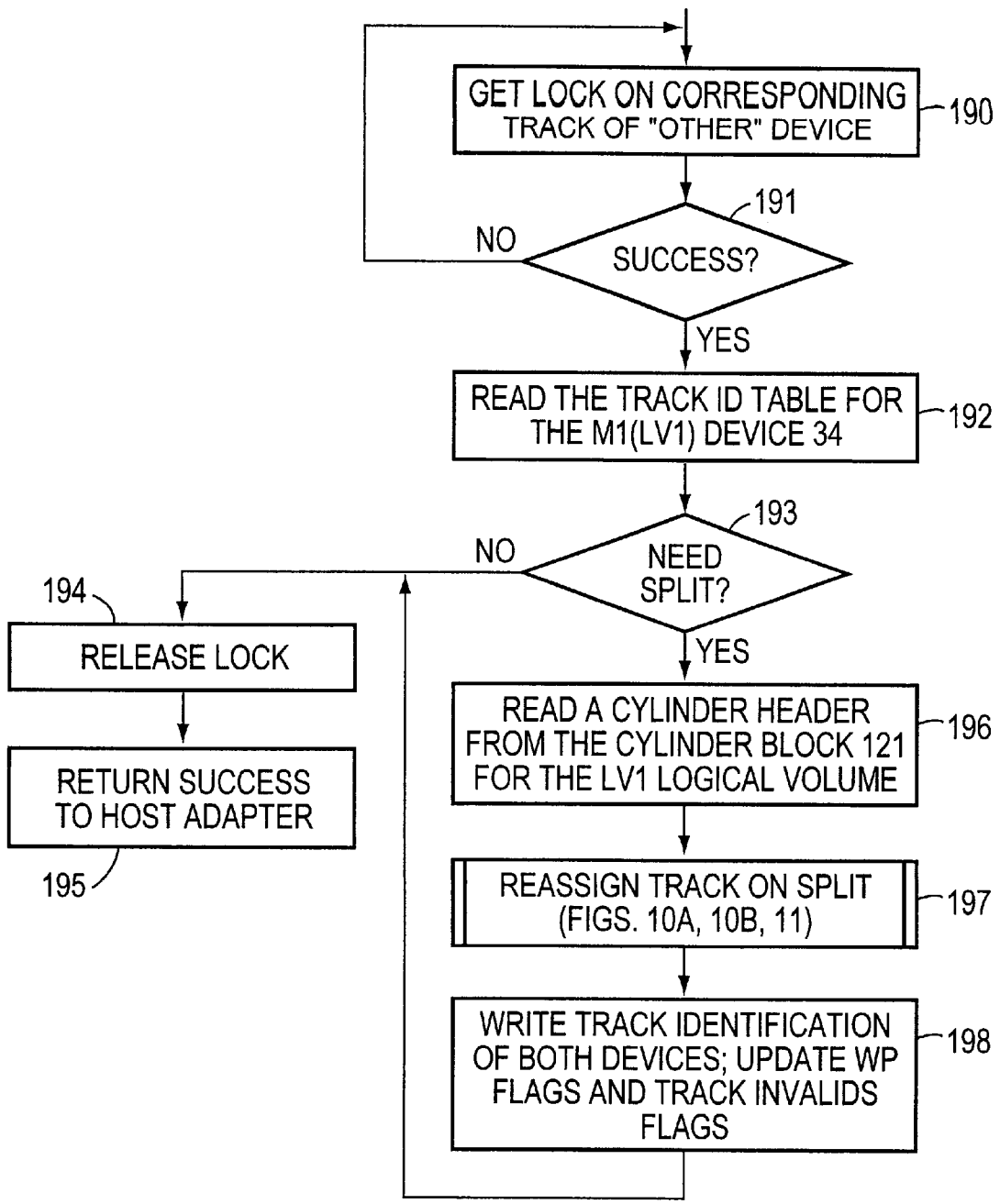

FIG. 6 depicts the procedure involved by the calls 176 and 177 in more detail. If a track is to be split, steps 190 and 191 form a loop to get a lock on the corresponding track of the "other device". Once the lock on this other device is obtained, step 192 reads the Track ID Table 132 for the M1(LV1) device 34, particularly the NTS bit 141. If no split is required because the track was previously split by the background process, control merely shifts from step 193 to step 194 to release the lock and return a success message to the host adapter.

Figure 10A:
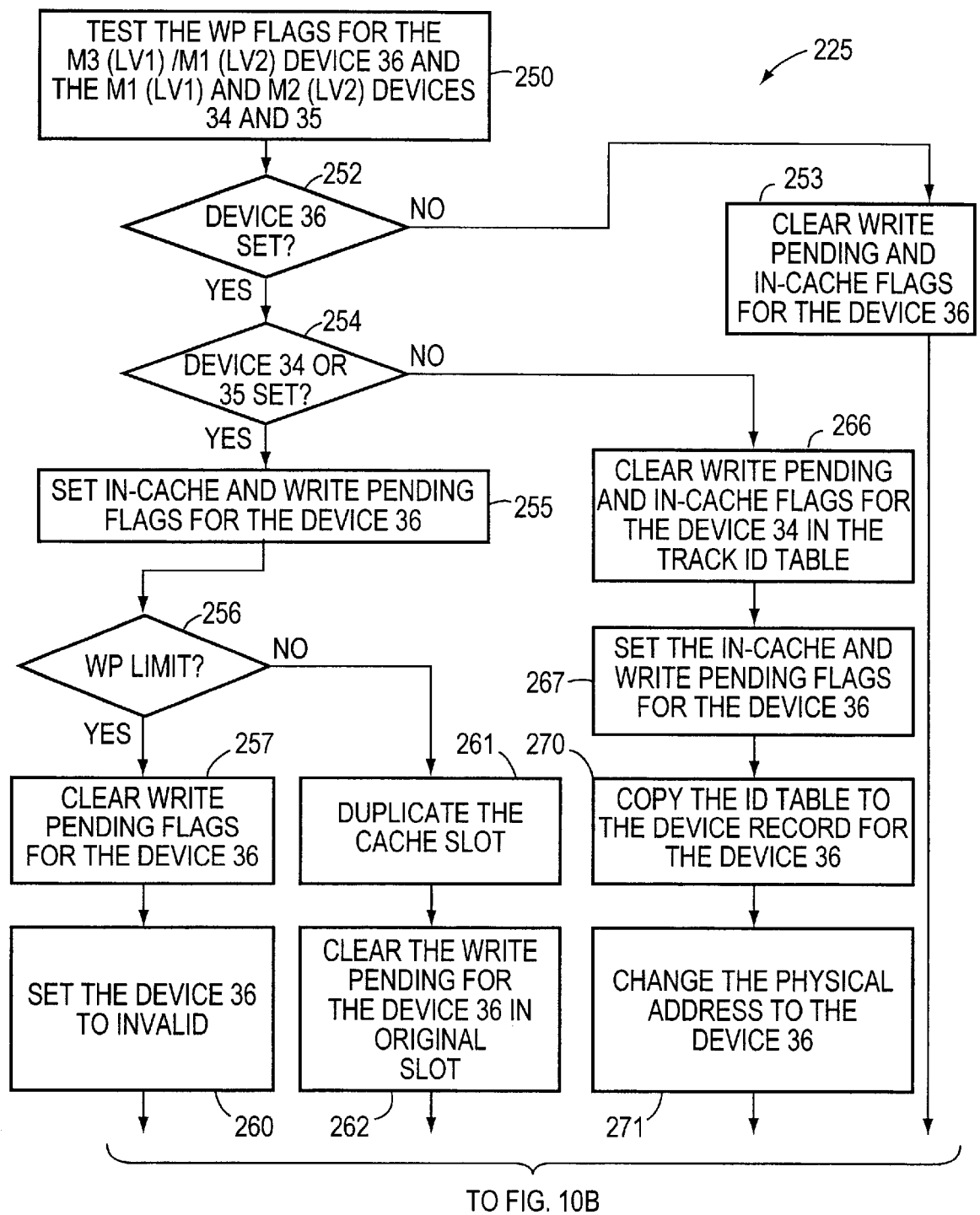
FIGS. 10A, 10B and 11 depict procedures used in conjunction with the operations of FIGS. 4 through 9 respectively.
Figure 10B:
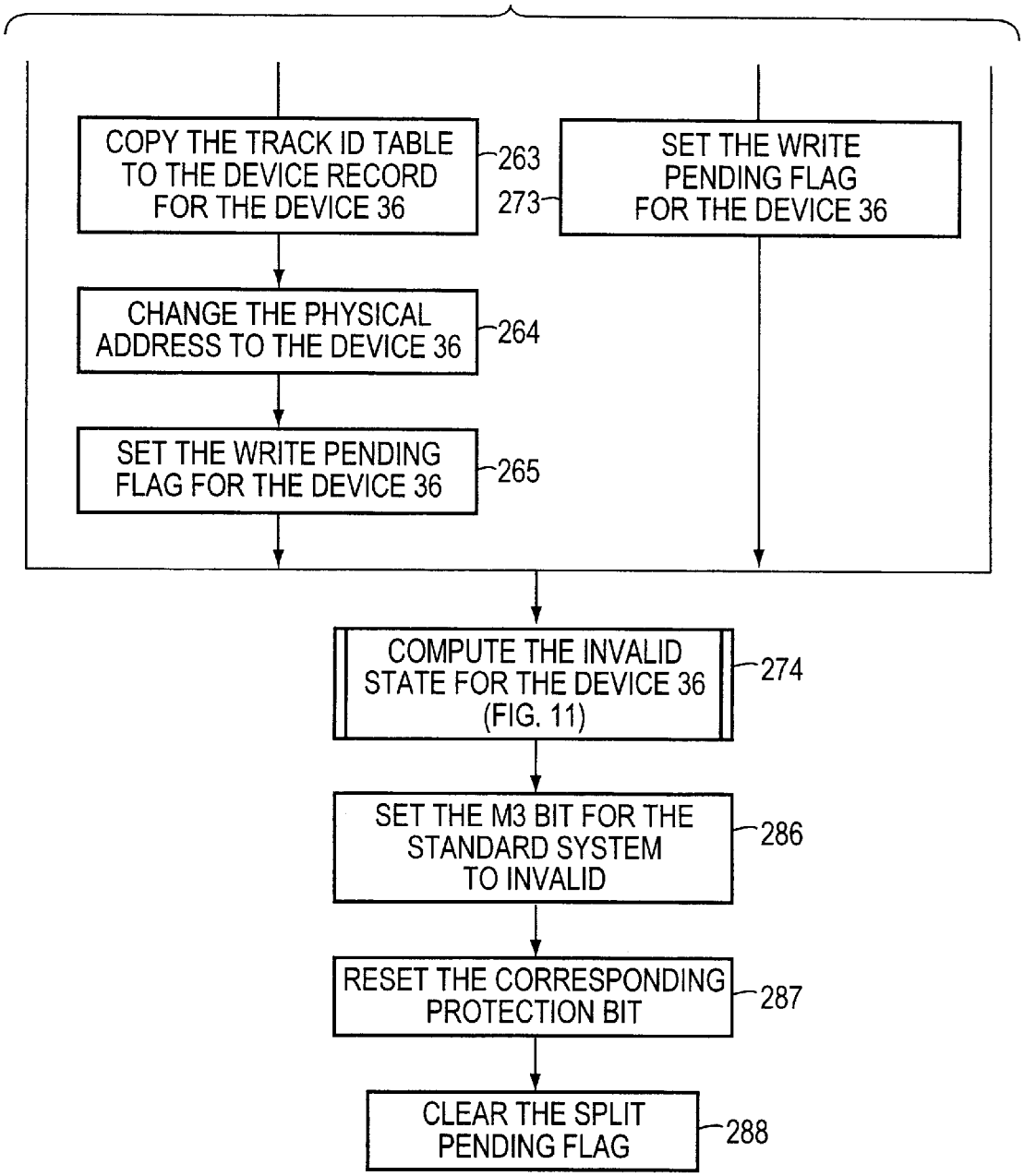
Figure 11:
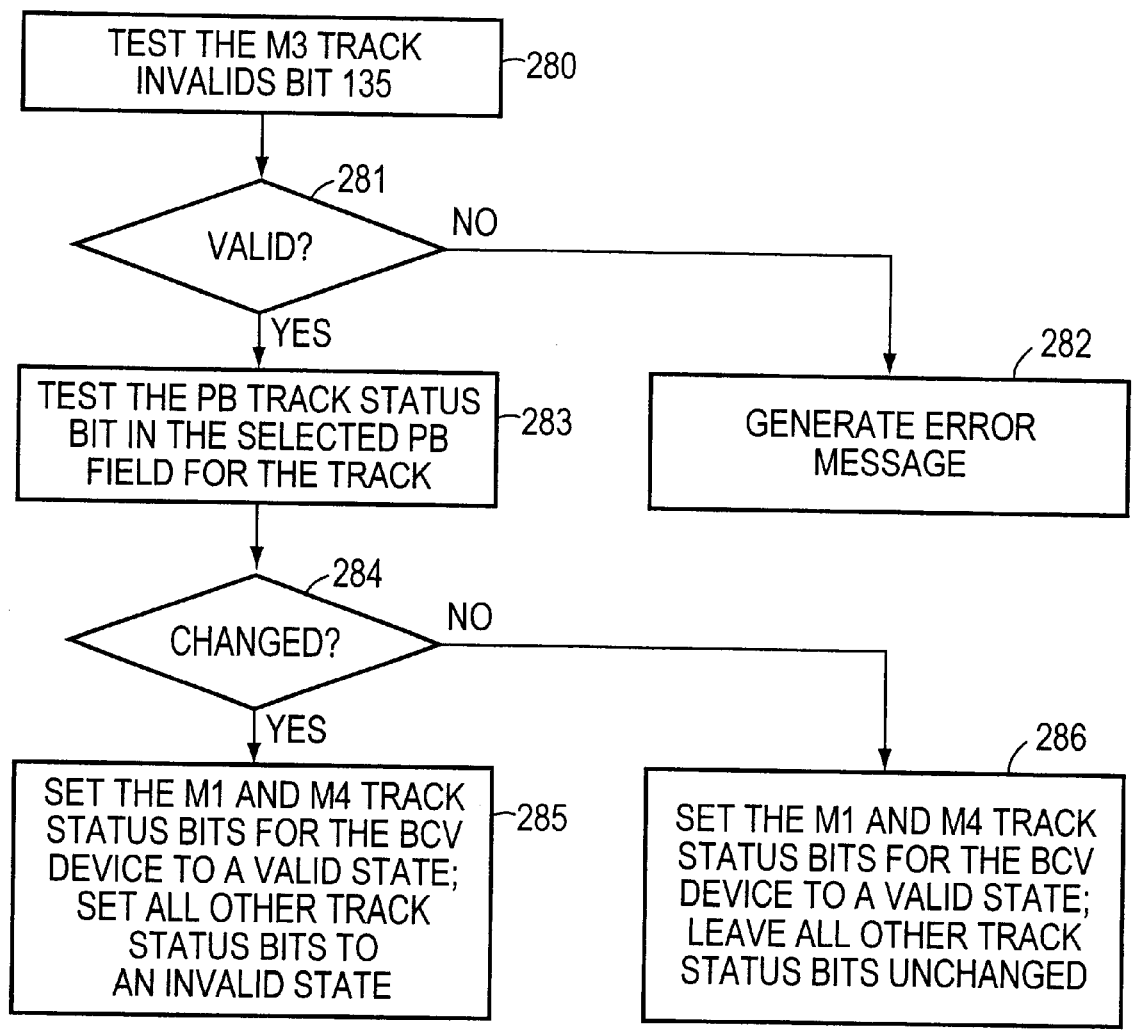

If a split is required, step 196 reads the cylinder headers 121 of the LV1 logical volume for subsequent use and then calls a procedure 197 to reassign the track. When this procedure, described later with reference to FIGS. 10A, 10B and 11, is complete, step 198 writes the track identification of both devices and updates the WP1 through WP4 write pending and the M1 through M4 track invalids flags. Thereafter control transfers to step 194 to release the lock.

Thus each time the host of the APP A application 13 issues a write request and each time the APP B application issues a read or write request, the modules represented in FIGS. 5 and 6 test the corresponding data tracks in all affected devices such as the M1(LV1) device 34 and the M3(LV1)/M1(LV2) device 36. If the addressed track needs to be split because a write request is still pending, appropriate action is taken to assure that the data being read or written does not adversely effect the integrity of the data on the corresponding device. In addition, the various M1 through M4 track invalids bits are also updated as will be discussed with reference to the procedure of FIGS. 10A and 10B.

Background Process

Figure 7:
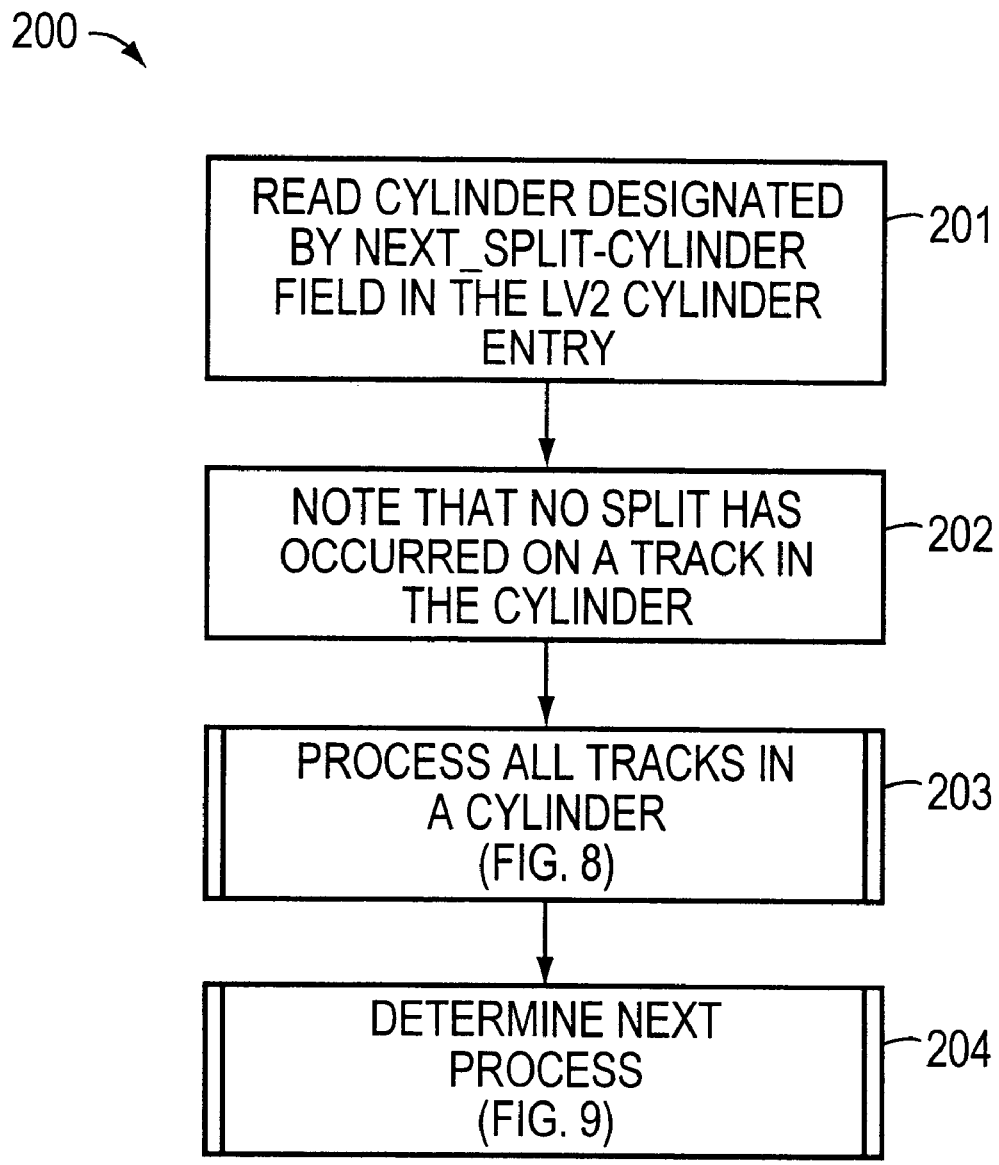
FIGS. 7, 8 and 9 depict the operation of a background module for processing write pendings.

A further improvement in the operation of a system responsive to a command like the INSTANT SPLIT command can be obtained by providing a second, or complementary, module for processing write pendings and other matters in the form of a background module or monitor, enabled in step 160 in FIG. 4. FIG. 7 broadly depicts the procedure and organization of the monitor 200 that, in the specific implementation of this invention by the assignee, is a dispatched task with the interval between tasks being selected by the system operator.

Each time the task is dispatched, the module reads the next-split-cylinder (NSC) field for the LV2 volume in step 201 in the cylinder header 122. Step 202 sets an internal flag or otherwise notes that no split has occurred on any track in the selected cylinder. Procedure 203 then processes all the tracks in the cylinder selected by the next-split-cylinder (NSC) field to determine whether any specific track needs to be split. If a split is required, the system notes that a split needs to occur and appropriately modifies the contents of the flag or other notation for which the default was set in step 202. Procedure 204 then monitors various conditions to determine whether (1) all the operations have been completed so that the monitor can be disabled or (2) additional operations are required.

Figure 8:
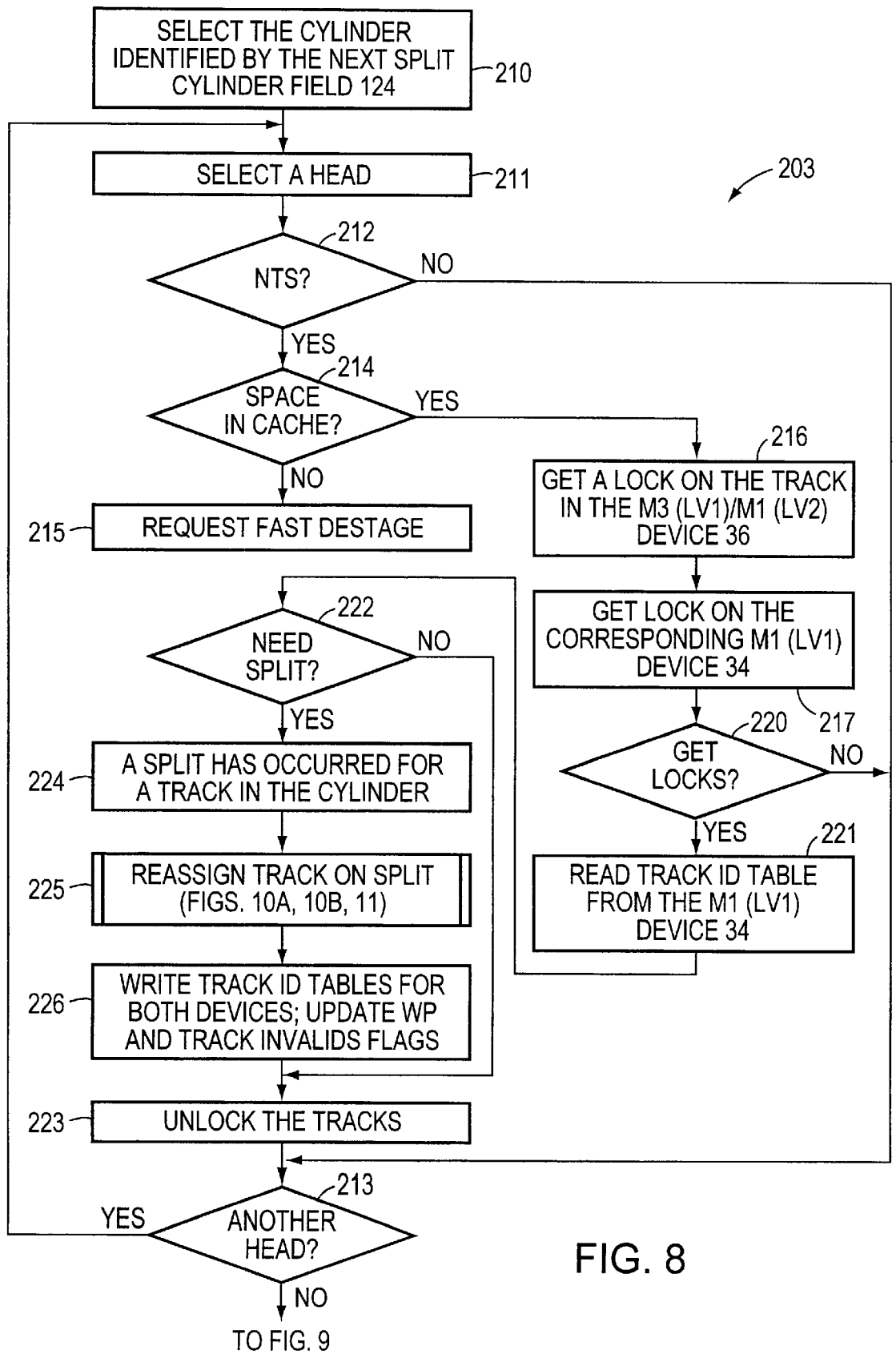

FIG. 8 depicts the procedure 203 in greater detail. Step 210 selects the cylinder identified by the next-split-cylinder (NSC) field in the cylinder entry 122. Step 211 then selects a first read/write head (i.e., track) in the first step of an iterative process which will typically select the heads and tracks in the selected cylinder in a numeric sequence. Step 212 examines the NTS (need to split) flag, such as the NTS flag in the corresponding Track ID Table 142 in FIG. 3. If not set, no splitting is required; so control passes directly to step 213 that determines whether all the heads have been tested. If additional heads are involved, control passes back up to step 211 to select another head.

When a head is selected for a track that needs to be split, step 212 transfers controls to step 214 to determine whether the cache 20 in FIG. 3 has sufficient capacity to accept a duplicate cache slot. In the unlikely event it does not, step 214 transfers to step 215 to request a fast destage operation thereby to make that space available and the system returns to the monitor.

Normally, however, control transfers to steps 216 and 217 to get a lock on the corresponding tracks in the M3(LV1)/M1(LV2) device 36 and the M1(LV1) device 34. If the locks are not obtained, step 220 transfers control to step 213 to shift to another head. Locks might not be obtained for the example, if the request were made while the host was processing a write request to that particular track.

If the locks are obtained, control transfers from step 220 to step 221 that reads a corresponding Track ID Table, such as the Track ID Table 132 for the standard or M1(LV1) device 34. Step 222 tests the NTS bit 141. If the track does not need to be split, control transfers to step 223 to release the locks obtained in steps 216 and 217.

If a split is required, control passes to step 224 that, for internal purposes, indicates that a split has occurred for the track thereby to change the status established in step 202 of FIG. 7. Then procedure 225, defined more clearly in FIGS. 10A and 10B, reassigns the track. This procedure assures that the information in the various cache slots is correctly updated depending upon the particular combinations of pending write operations and completed or destaged write operations that may have existed at that time the transfer to the second operating mode occurred. When this procedure completes, step 226 writes the track identification for both devices. It also updates the WP1 through WP4 write pending flags and the M1 through M4 track invalids flags. Then control transfers to step 223 to release the locks obtained in steps 216 and 217. Thereafter step 226 passes control to step 213 to examine another head.

As will now be apparent, procedure 203 normally includes testing of fifteen tracks in a cylinder so the operation occurs in a few microseconds. Consequently locking all the tracks in a particular cylinder has little chance of interrupting the operating procedures of the applications being processed.

Figure 9:
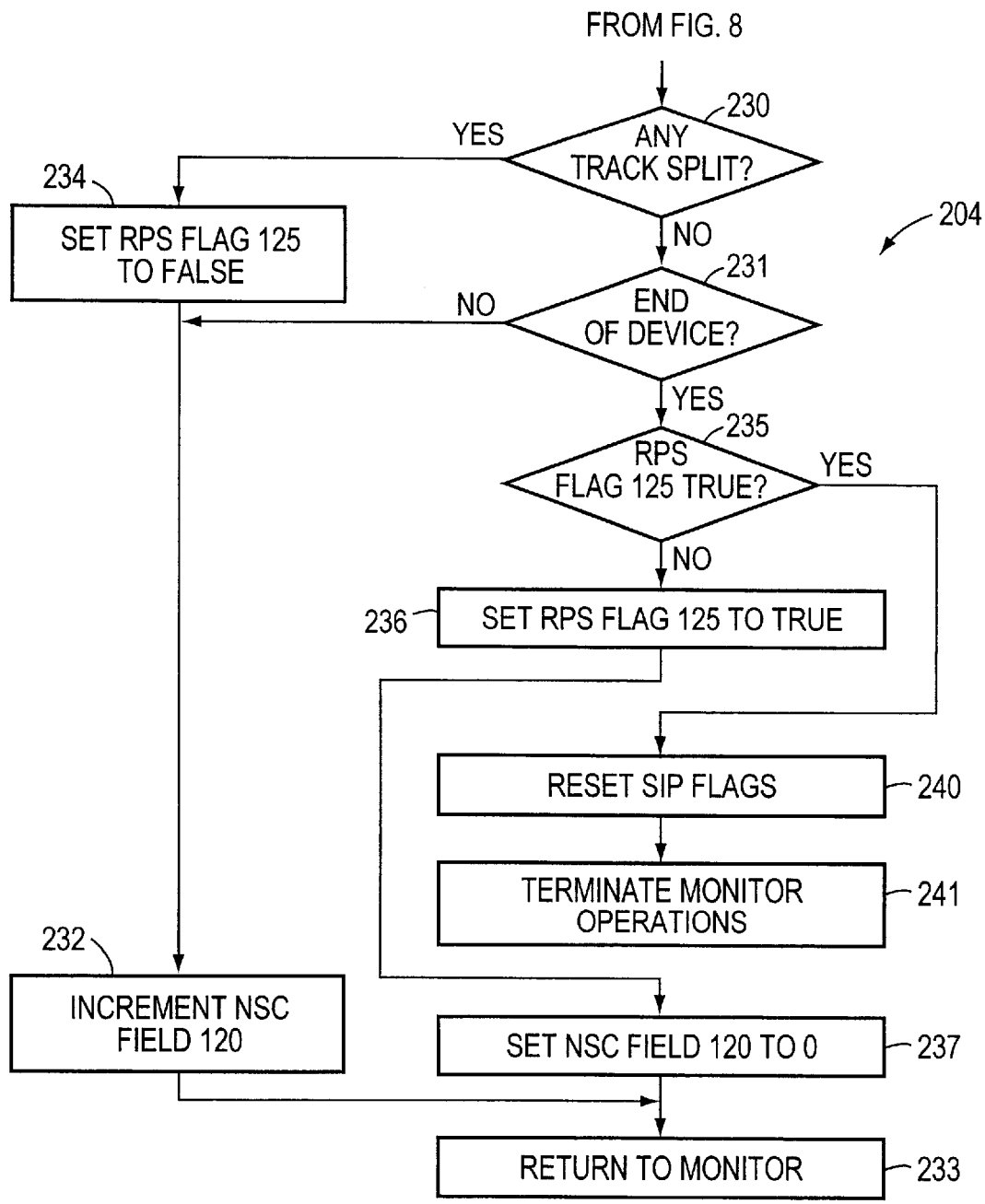

Once all the heads in a cylinder have been examined, control transfers from step 213 in FIG. 8 to step 230 shown in FIG. 9 to determine whether this management phase has been completed. If the process reaches step 230 either from the path including step 212 or step 220 in FIG. 8, no track will have been split and control transfers to step 231. If there are additional cylinders in the device, step 231 transfers control to step 232 to increment the NSC field in the cylinder block 122 and then return to the monitor in step 233. When this occurs the monitor operation is complete and the monitor will be idle until it is dispatched again. Generally the interval between successive monitor iterations will be in the millisecond range.

If any track has been split as indicated by the action of step 224 in FIG. 8, step 230 transfers control to step 234 that sets the RPS flag in the cylinder block 122 to a false state and then transfers control to step 232.

When all the cylinders in the LV2 logical volume have been tested, the RPS flag in the cylinder entry 122 will be false if any split operation occurred. In that case, step 236 sets the RPS flag to a true state and step 237 rests the NSC counter in the cylinder entry 122 to 0. This causes the system to examine all the tracks in the LV2 logical volume again.

When all the tracks are tested without performing a split, the RPS flag will be true. Control then transfers from step 235 to step 240 that resets an SIP flag 124 in the cylinder entry 123 and the corresponding SIP entry in the cylinder entry 122. Step 241 then terminates the monitor operations and this terminates the management phase of the split operation. Thereafter all disk transfer requests are handled normally. However, as the SIP flags are cleared, step 168 in FIG. 5 transfers control directly to step 170. Consequently once the management phase is complete, the steps 102 through 167 impose no significant burden on the data transfer process.

Thus FIGS. 7 through 9 depict a second, or background, module in which the procedures in FIGS. 8 and 9 examine each track in the system in an orderly fashion and perform a split only as required. Again any locking involved is limited to a specific track or set of a specific tracks in corresponding devices. Consequently it is statistically unlikely that such locking of individual tracks will adversely effect the operation of the system in response to application programs.

Track Reassignment

In systems, such as shown in FIG. 1 where the BCV device, such as the M3(LV1)/M1(LV2) device 36 has a mirror in the second operating mode, such as the M2(LV2) device 37, it becomes necessary to account for all changes that occurred in the LV1 logical volume during the first operating mode. The track reassignment function shown in FIGS. 10A, 10B and 11 and called by either step 197 in FIG. 6 or step 225 in FIG. 8 performs this function. Specifically the track reassignment function handles any pending write operations for the track. It also processes the invalid flags, such as the flags 135 through 136 in FIG. 3, so that the M2(LV2) device 37 is brought into synchronism with the M3(LV1)/M1(Lv2) device 34.

When the track reassignment procedure begins, it is possible that for a given track a WP flag assigned to a specific mirror could indicate that either, both or neither device has a write pending. If there is no write pending associated with the M3(LV1)/M1(LV2) device 36 there is no pending write operation for that track in the BCV device, such as the M3(LV1)/M1(LV2) device 36, so the WP3 flag 107 and the in-cache (IC) flag 140 can be cleared.

If a write pending exists for the M3(LV1)/M1(LV2) device 36, step 254 tests the header for the cache slot associated with the track to determine if a write pending exists for either of the M1(LV1) or M2(LV1) devices 34 and 35, thus requiring the cache slot to be duplicated. Step 252 begins the process by testing the write pending flag in the cache slot for the LV1 logical volume using the PTR block 137 in a Track ID Table, such as the Table 31, as a pointer to the cache slot, such as the cache slot 101. If the BCV device is the M3 mirror for the LV1 logical volume, step 252 would test the WP3 flag in the addressed cache slot, such as the WP3 flag 107 associated with the cache slot 101. If the test at step 254 determines one or both of the M1(LV1) and M2(LV2) devices 34 and 35 also has a write pending flag set, step 255 sets the in-cache (IC) flag in the Track ID Table 143 and the WP3 flag 107 for the cache slot 101.

The cache 20 in FIG. 3 has a theoretical finite limit. Step 256 determines whether adding another cache slot would exceed that limit. In such an unusual circumstance, step 257 clears the write pending flags for the M3(LV1)/M1(LV2) device 36 and then sets the M3(LV1)/M1(LV2) device 36 to an invalid state in step 260.

Normally there is sufficient space, so step 256 diverts to step 261 whereupon the cache slot is duplicated. Step 262 clears the WP3 flag 107 in the original slot so only the new cache slot has the WP3 flag set. In step 263 the procedure copies the Track ID Table for the LV1 logical volume, such the Table 132, to the corresponding position in the Track ID Table, such as the Table 142. Step 264 updates the PTR field in the Track ID Table, such as Track ID Table 143, to identify the new cache slot for the LV2 logical volume. Step 265 sets the WP flag associated with the BCV device, such as the WP3 flag in the cache slot. Thus, if the track reassignment function is called when there are pending write operations for both the BCV device, such as the M3(LV1)/M1(LV2) device 36 and either or both of the standard mirrors for the LV1 logical volume, such as the M1(LV1) and M2(LV2) devices 34 and 35, the track reassignment function duplicates the cache slot, and updates the pointers to the new cache slot.

If the write pending only exists with respect to the M3(LV1)/M1(LV2) device 36, steps 252 and 254 direct control to step 266 wherein WP1 and WP2 flags in the cache slot are cleared and the in-cache IC flag for the LV1 logical volume in the Track ID Table 132 is cleared. Step 267 sets the in-cache IC flag in the Track ID table 142 for the LV2 logical volume and the corresponding WP flag, such as the WP3 flag, in the cache slot. Step 270 then copies the Track ID Table, such as the Track ID Table at 132 to the Track ID Table for the corresponding track, such as the Track ID Table 143. Step 271 changes the PTR field in the Track ID Table 143 to point to the cache slot; step 273 sets the write pending flag for the M3(LV1)/M1(LV2) device 36 in the cache slot for the LV2 logical volume.

Thus, in the context of this description the initial phase of the track reassignment function handles pending write operations according to one of three procedures. Whatever the selected procedure, when this phase is complete control transfers to a procedure 274 in FIG. 10B that computes the invalid states for the M3(LV1)/M1(LV2) device 36 and assures that any mirrors associated with the LV2 logical volume are synchronized with the M3(LV1)/M1(LV2) device 36.

Referring to FIG. 11, the invalids procedure 274 examines the invalid bit for the BCV device in the LV1 logical volume, such as the M3 bit 135 in step 280. Step 281 acts as a redundant test to assure a correct operating procedure. That is, at step 281, the tested invalid bit should always have a "valid" state. An "invalid" state represents an error condition causing step 282 to generate an error message. Again, normally the tested bit has a valid state, so step 281 transfers to step 283 to test a corresponding PB bit in the cylinder header 144 to determine if a change occurred in that track during the prior first operating mode.

If a change has occurred, step 285 sets the invalid bits appropriately to force the data in the track to be copied to other mirrors for the LV2 logical volume. This is accomplished by setting the invalid bit associated with the BCV device and the M4 bit to a valid state and setting all other invalid bits to an invalid state. In the specific embodiment shown in FIGS. 1 and 3, step 285 sets the M1 and M4 invalid bits in the Track ID Table 143 to a valid state and the M2 and M3 invalid bits to an invalid state. Consequently and in accordance with normal mirroring operations, a copy program will copy the track from the M3(LV1)/M1(LV2) device 36 to the M2(LV2) device 37.

Using this same specific example, if no change occurs, step 286 still sets the M1 and M4 bits to a valid state. However, the M2 and M3 bits remained unchanged.

Referring again to FIG. 10B, once the procedure 274 completes, step 286 sets the M3 bit for the LV1 logical volume to an invalid state indicating that the data has been altered since the split occurred. The protection bit would then be reset at step 287 and the NTS flags for the track in both the LV1 and LV2 logical volume device headers are cleared indicating that the split had been completed.

Figure 12:
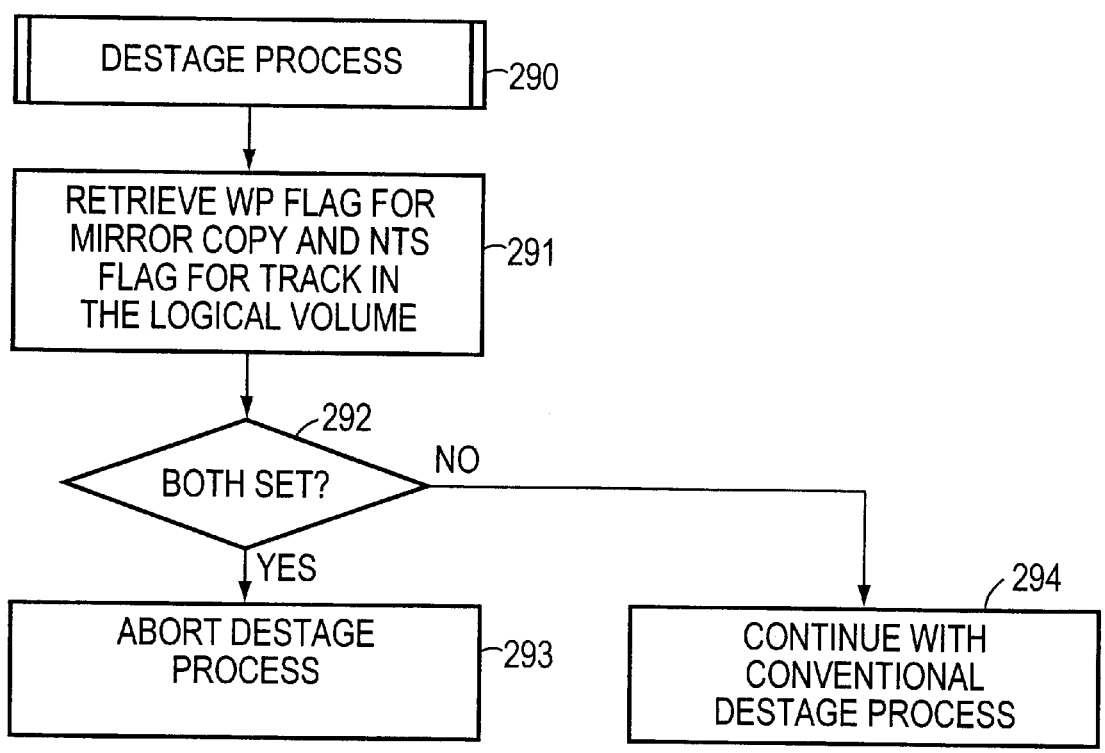
FIG. 12 depicts a procedure for modifying a conventional destaging process for write operations.

As previously indicated, each time a host performs a write operation, the data associated with the write operation is stored in a cache slot in the cache 20 of FIG. 1, such as the cache slot 101 in FIG. 3. Thereafter the destaging process, that operates asynchronously with respect to the operations depicted in FIGS. 4 through 11, moves the data to a corresponding track on a physical disk drive. FIG. 12 depicts a modification to that process so that the process is compatible with this invention. Each time the destaging process 290 begins, step 291 monitors the WP flag for the mirror copy for which the destaging process is running and the NTS flag for the track in the logical volume to which the data in the cache slot is directed. If step 292 determines that both flags are set, step 292 diverts to step 293 to abort the destaging process with respect to that specific cache slot when there is a need to split that particular track. If there is no need to split the track, the destaging continues to step 294 for conventional processing.

As an example, suppose the cache slot 101 in FIG. 3 includes data with the WP1 through WP3 flags set. Assume that step 166 in FIG. 3 has set the NTS bit 141 in the corresponding track in the Track ID Table 132. When the destaging process identifies the slot and the M1(LV1) mirror 34 by examining the WP1 flag 105, the destaging for that cache slot and mirror will abort because step 292 will transfer control to step 293. If the NTS bit 141 is not set, control transfers to step 294 for normal destaging.

In summary and referring to FIG. 1, there has been described a data storage facility, such as the data storage facility 14, with a buffer, or cache 20, and at least first and second data stores, such as the M1(LV1) and M3(LV1)/M1 (LV2) devices 34 and 36. In a first operating mode, the M1(LV1) and M3(LV1)/M1(LV2) devices 34 and 36 operate as mirrors in response to a first data process, such as the APP A application 12. An INSTANT SPLIT command shifts the operation of the data storage facility into a second operating mode. The M3(LV1)/M1(LV2) device 36 becomes attached immediately to a second data process, such as the APP B application 13 and no longer mirrors the data in the M1(LV1) device 34. Interactions between the first and second data processes and the first and second data stores can then begin, even though write operations initiated during the first operating mode may not have been destaged.

Each time the first data process directs a write operation to a track in the LV1 logical volume or the second data process directs a read or write operation to a track the LV2 logical volume steps are taken to determine whether a write operation is pending to that track requiring that the track be split. Alternatively, a background process tests each track in the data stores to identify any pending write operations and splits any relevant tracks. These two processes act in conjunction to assure that all pending write operations are managed in an orderly fashion. Moreover, the processes assure that the management of write pending operations occurs concurrently with and transparently to normal data transfer requests between the first data process and data store and between the second data process and data store.

This invention has been disclosed in terms of certain embodiments. For example, this invention has been described in terms of an integrated data storage facility in which elements, such as the disk adapters 23, 24, 25 and 26 and their associated physical disk drives are collocated. As the capabilities of digital data networks increase is may be advantageous to distribute the various elements and the functions they perform throughout a network. For example, each of the disk adapters and/or physical disk drives could be located at different nodes on a network. In such a configuration each function described in this specification will still be performed with, at most, minor and apparent variations to accommodate the operations to a distributed network environment. It will be apparent these and many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A data storage facility with first and second data stores means, and a buffer means in which first and second data processes manipulate common data comprising:

A) pending write controller means responsive to a write request from a data process for identifying a specific location being transferred to said buffer means as a pending write request with the data associated with the pending write request thereafter being transferred to the specific location at a corresponding data store, B) means for establishing a first operating mode during which the second data store means acts as a mirror for the first data store means that interacts with the first data process, C) operating mode means for transferring the operation of the storage facility from the first operating mode to a second operating mode during which said second data store means interacts with the second data process and ceases to act as mirror for said first data store means, and D) control means for controlling the processing of all pending write requests during the second operating mode at the time said operating mode means effects the transfer to the second operating mode, said pending write request controller means operating in parallel with and transparently to the interaction between the first and second data store means with the first and second data processes, respectively.

2. A data storage facility as recited in claim 1 wherein each of said data stores means has addressed locations and said operating mode means includes:

i) first processing means for processing of any pending write operations in the buffer means in an ordered fashion in parallel with and asynchronously with respect to operations between the data processes and their respective data stores means, and ii) second processing means responsive to a predetermined data transfer request to an addressed location from the first and second data stores for processing any pending write operation in an area of the buffer means that is assigned to that addressed location.

3. A data storage facility as recited in claim 2 wherein the predetermined data transfer request includes write commands from the first and second data processes and read commands from the second data process, said second processing means including decoding means for decoding data transfer request for the predetermined requests.

4. A data storage facility as recited in claim 3 including, for each data store and for each addressed location in the data store, means for defining a table of flags including at least one write-pending flag that identifies each write request pending in the buffer means and a second flag indicating that specific track to be processed by the second processing means, each write data transfer request normally transferring the request to the buffer means and updating a corresponding write-pending flag.

5. A data storage facility as recited in claim 4 including additional flags and means for updating the state of the additional flags in response to the status of the write pending flags, said first and second processing means enabling said updating means.

6. A data storage facility as recited in claim 5 including means for generating a duplicate cache slot in response to predetermined states of the write pending flags.

7. A data storage facility that controls data transfers in a data processing system with first and second data processors and that includes first and second data stores and a buffer, the data storage facility responding to a predetermined transfer request by transferring data to a write pending location in the buffer and thereafter transferring the data to the data stores whereby during a first operating mode the first and second data stores act as mirror memories, said data storage facility including a control initiated upon receipt of a predetermined command for connecting the second data store for operation with the second data processor in parallel with continued operations between the first data store and the first data processor, said control comprising:

A) means for maintaining, during the first operating mode, an identification of all write pending locations for data to be transferred from the buffer to the second data store, B) means for establishing a temporary operating mode in response to the predetermined command to connect the second data store to operate with the second processor and isolate the second data store from the first processor, C) means for establishing a list of all write pending locations for data to be transferred to the second data store upon the establishment of the temporary operating mode, and D) transfer means operable during the temporary operating mode for responding to data transfer requests for data in a write pending data location in the list in either of the first and second data stores thereby to effect a transfer of the data to the second data store.

* * * * *